United States Patent
Mitchell et al.

(10) Patent No.: US 7,486,227 B2
(45) Date of Patent: Feb. 3, 2009

(54) SYSTEM AND METHOD FOR REMOVAL OF SEA-STATE BIAS IN SATELLITE ALTIMETRY DATA

(75) Inventors: Douglas A Mitchell, Tomball, TX (US); William J Teague, Slidell, LA (US); Kirk R Whitmer, New Orleans, LA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 300 days.

(21) Appl. No.: 11/466,561

(22) Filed: Aug. 23, 2006

(65) Prior Publication Data

US 2007/0194980 A1 Aug. 23, 2007

Related U.S. Application Data

(60) Provisional application No. 60/712,608, filed on Aug. 23, 2005.

(51) Int. Cl.
*G01S 13/00* (2006.01)
*G01S 13/08* (2006.01)
*G01S 7/40* (2006.01)

(52) U.S. Cl. .................. 342/120; 342/26 R; 342/26 A; 342/118; 342/165

(58) Field of Classification Search ............... 342/26 R, 342/26 A, 26 B, 59, 120, 123, 118, 165
See application file for complete search history.

(56) References Cited

U.S. PATENT DOCUMENTS 6,380,886 B1 * 4/2002 Jacobs ........................ 342/120
2004/0145514 A1 * 7/2004 Raney ........................ 342/120

OTHER PUBLICATIONS

Mitchell, D. A., Teague, W. J., and Whitmer, K.R., "Evidence Sea State Bias☐☐is Different for Ascending and Desending Tracks," Marine Geodesy, vol. 27,☐☐ssue 3-4, pp. 483-494 (Nov. 2004).*

(Continued)

*Primary Examiner*—Thomas H Tarcza
*Assistant Examiner*—Peter M Bythrow
(74) *Attorney, Agent, or Firm*—John J. Karasek; Sally A. Ferrett

(57) ABSTRACT

A method for correcting bias in altimetry data for ascending satellite tracks and descending satellite tracks. For satellites operating in tandem, calculate ascending track bias between the height measurement made by the first and the second satellites for the ascending tracks in a region, calculate an ascending bias correction by least squares fitting a polynomial to the bias as a function of significant wave height for the ascending tracks, and apply a portion of the ascending track bias to the sea surface height measurements. The correction can be calculated based on only one track and its crossover points. Another embodiment uses data from only one satellite, estimates the sea state bias at the crossover points separately for the ascending and descending tracks, and apportions a percentage of the difference at the crossover points to the tracks based on minimizing the rms differences between the ascending and descending tracks.

11 Claims, 10 Drawing Sheets

OTHER PUBLICATIONS

Chambers, D.P., S.A. Hayes, J.C. Ries, and T.J. Urban, "New TOPEX sea state bias models and their effect on global mean sea level", J. Geophys. Res. vol. 108, No. C10, 3305, doi:10.1029/2003JC001839, pp. 3-1-3-7, (2003).*

Mitchell, D. A., Teague, W. J., and Whitmer, K.R., "Evidence Sea State Bias is Different for Ascending and Desending Tracks," Marine Geodesy, vol. 27, Issue 3-4, pp. 483-494 (Nov. 2004).

Whitmer, K.R., and G.A. Jacobs, "Altimeter signal to noise for deep ocean processes in operational systems", Marine Geodesy, vol. 27, Issue 3-4, pp. 433-451 (Nov. 2004).

Chambers, D.P., S.A. Hayes, J.C. Ries, and T.J. Urban, "New TOPEX sea state bias models and their effect on global mean sea level", J. Geophys. Res. vol. 108, No. C10, 3305, doi:10.1029/2003JC001839, pp. 3-1-3-7, (2003).

Chelton, D.B., R.A. deSzoeke, M.G. Schlax, K. El Naggar, and N. Siwertz, "Geographical variability of the first baroclinic Rossby radius of deformation", J. Phys. Oceanogr., vol. 28, pp. 433-460 (1998).

Colombo, O.L., "The dynamics of Global Positioning System orbits and the determination of precise ephemerides", J. Geophys. Res. vol. 94, No. B7, pp. 9167-9182 (1989).

Gaspar, P., Labroue, S., Ogor, F., Lafitte, L., Marchal, L., and M. Rafanel, "Improving nonparametric estimates of the sea state bias in radar altimeter measurements of sea level", J. Atmos. Oceanic Technol., vol. 19, pp. 1690-1707 (2001).

Gaspar, P., Ogor, F., Le Traon P.-Y., and O.Z. Zanife, "Estimating the sea state bias of the TOPEX and POSEIDON altimeters from crossover differences", J. Geophys. Res., vol. 99, pp. 24,981-24,994 (1994).

Leeuwenburgh, O., and D. Stammer, "Uncertainties in altimetry-based velocity estimates", J. Geophys. Res., vol. 107, No. C10, 3175, doi: 10.1029/2001JC000937, pp. 39-1-39-16, 2002.

Menard, Y., L.-L. Fu, P. Escudier, F. Parisot, J. Perbos, P. Vincent, S. Desai, B. Haones, and G. Kunstmann, "The Jason-1 mission", Mar. Geod., vol. 26, pp. 131-146 (2003).

Parke, M.E., R.L. Stewart, D.L. Farless, and D.E. Cartwright, "On the choice of orbits for an altimetric satellite to study ocean circulation and tides", J. Geophys. Res., vol. 92, 11,693-11,707 (1987).

Powell, B.S., and R.R. Leben, "An optimal filter for geostrophic mesoscale currents from along track satellite altimetry", J. Atmos. & Oceanic Tech., vol. 21, Iss. 10, pp. 1633-1642 (Oct. 2004).

Stammer, D., and C. Dietrich, "Space-borne measurements of the time-dependent geostrophic ocean flow field", J. Atmos. Oceanic Technol., vol. 16, pp. 1198-1207 (1999).

Vincent, P., Desai, S.D., Dorandeu, J., Ablain, M., Soussi, B., Callahan, P.S., and B.J. Haines, "Jason-1 Geophysical Performance Evaluation", Mar. Geod., vol. 26, pp. 167-186 (2003).

Chelton, D. B., WOCE/NASA Altimeter Algorithm Workshop, "World Ocean Circulation Experiment", US WOCE Technical Report, No. 2, Nov. 1998, U.S. Planning Office for WOCE, pp. ii-vii and 1-70.

* cited by examiner

SYSTEM AND METHOD FOR REMOVAL OF SEA-STATE BIAS IN SATELLITE ALTIMETRY DATA

CROSS-REFERENCE TO RELATED APPLICATIONS

This Application is a Non-Provisional of Provisional (35 USC 119(e)) application 60/712,608 filed on Aug. 23, 2005, the entire disclosure of which is incorporated by reference in its entirety.

BACKGROUND OF THE INVENTION

FIG. 1 illustrates the sea surface height and a satellite measuring the sea surface height with an altimeter. Sea surface height is the deviation in sea surface level from the marine geoid, an expected value that takes into account the earth's gravity and the bottom topography of the ocean. Sea surface height can also be affected by ocean eddies, temperature of the upper ocean water, tides in the deep ocean, and ocean currents or ocean circulation.

NASA began tracking ocean surface topography in 1992 with TOPEX/Poseidon, a joint US-French space mission from an orbit 1336 km above the ocean surface. In addition, the JASON-1 spacecraft was launched in 2001 to track ocean surface topography. The spacecrafts' radar altimeters measure the precise distance between the satellite and sea surface by measuring the round-trip travel time of microwave pulses bounced from the spacecraft to the sea surface and back to the spacecraft. The satellite's position is known from laser measurements and by triangulation with GPS satellites. The altitude of the satellite is determined by a sophisticated estimation procedure based on an orbit determination measurement system both onboard the satellite and on the ground stations located all over the world. The details of the shape of the returned radar pulses also provide information on wave height.

Since the TOPEX/POSEIDON satellite was launched, models have been developed and applied to the altimetry measurements, with a goal improving the accuracy of the sea surface height measurements.

During an eight month period after launch, Jason-1 was in a verification phase in which its orbit was positioned to sample the ocean within 1 km of the nominal ground track at the equator and 72 seconds ahead of the T/P satellite, as discussed in Menard, Y., L.-L. Fu, P. Escudier, F. Parisot, J. Perbos, P. Vincent, S. Desai, B. Haones, and G. Kunstmann, "The Jason-1 mission", Marine Geodesy, Vol. 26, pages 131-146 (2003). After the verification tandem phase, T/P was repositioned into a ground track interleaved with the Jason-1 orbit to begin a scientific tandem phase.

One important application of satellite altimeter data is the estimation of the zonal and meridional components of the geostrophic velocity fields. Prior to the beginning of the scientific tandem phase, a crossover method was the primary way to estimate geostrophic velocities from exact repeat orbit satellite measurements at the intersections of ascending and descending tracks. A crossover method is discussed in Parke, M. E., R. L. Stewart, D. L. Farless, and D. E. Cartwright, "On the choice of orbits for an altimetric satellite to study ocean circulation and tides", J. Geophysical. Research. Vol 92, issue/pages: 11,693-11,707 (1987).

During the scientific tandem phase, Jason-1 and T/P have coordinated orbits with half the spacing (ground-track separation) of the original T/P mission. At the equator, the T/P spacing is approximately 79 km. Stammer, D., and C. Dietrich, "Space-borne measurements of the time-dependent geostrophic ocean flow field", J. Atmos. Oceanic Technol., Vol. 16, pages 1198-1207 (1999) discuss a parallel track method for estimating the zonal and meridional components of the geostrophic velocity fields from between-track differences of sea surface height measured with the altimeters on Jason-1 and T/P during the scientific tandem phase.

Sea state bias (SSB) is a correction that is applied to the calculated sea surface height (based on the satellite altimeter) to account for differences in the reflection of the radar pulse due to surface waves. Vincent, P., Desai, S. D., Dorandeu, J., Ablain, M., Soussi, B., Callahan, P. S., and B. J. Haines, "Jason-1 Geophysical Performance Evaluation", Marine Geodesy, Vol. 26, pages167-186 (2003) discusses the sea state bias correction and indicates that the differences in the reflection of the radar pulse due to surface waves cause the largest part of the error in the range measurements of Jason-1 and T/P.

The sea state bias has been estimated empirically by fitting data to a relationship between sea state bias, surface wave height, and wind speed, as discussed in Gaspar, P., Ogor, F., Le Traon P. Y., and O. Z. Zanife, "Estimating the sea state bias of the TOPEX and POSEIDON altimeters from crossover differences", J. Geophys. Res., Vol. 99, pages 24,981-24,994 (1994) and in Chambers, D. P., S. A. Hayes, J. C. Ries, and T. J. Urban, "New TOPEX sea state bias models and their effect on global mean sea level", J. Geophys. Res. 108(C10), 3305, doi:10.1029/2003JC001839 (2003). Nonparametric methods are discussed in Gaspar, P., and J. P. Florens, "Estimation of the sea state bias in radar altimeter measurements of sea level: Results form a new nonparametric method", J. Geophys. Res., Vol.103, pages 15,803-15,814 (1998) and in Gaspar, Labroue, S., Ogor, F., Lafitte, L., Marchal, L., and M. Rafanel, "Improving nonparametric estimates of the sea state bias in radar altimeter measurements of sea level", J. Atmos. Oceanic Technol., Vol. 19, pages 1690-1707 (2001). These models assume the sea state bias is a global estimate with no spatial or directional dependence.

BRIEF SUMMARY OF THE INVENTION

An embodiment of the invention is directed to a method for determining a bias correction to a sea surface height measurement from a first satellite in a region, wherein the first satellite and a second satellite operate in a tandem orbit, an ascending track bias exists between the sea surface height measurements of the first and second satellites, and a descending track bias exists between the sea surface height measurement of the first and the second satellites. The method includes determining a correction for the ascending track sea surface height measurement, separately determining a correction for the descending track sea surface height measurement, and apportioning a portion of the correction to the sea surface height measurement from the first satellite.

In embodiments of the invention, determining a correction for the ascending sea surface height measurement can include least squares fitting a polynomial to the ascending track bias as a function of significant wave height. Determining a correction for the descending sea surface height measurement can include least squares fitting a polynomial to the descending track bias as a function of significant wave height.

In embodiments of the invention, the ascending track bias is a difference between the sea surface height measurement made from the first satellite and the second satellite for an ascending track. The descending track bias is a difference between the sea surface height measurement made from the first satellite and the second satellite for descending track.

The portion of the correction applied to the sea surface height measurement is an amount that minimizes the rms differences of the ascending and descending track polynomials with the portion of the correction applied to the whole track.

The method can also include filtering the sea surface height measurements before determining the ascending track bias and the descending track bias.

The region can have a length of between 1 and 5 multiples of a baroclinic Rossby radius of deformation for the region. Each region has at least one crossover point.

Another embodiment of the invention is directed to a method for determining a bias correction to a sea surface height measurement from a satellite in a region having at least one cross over point between an ascending track and a descending track. The method includes estimate sea state bias by applying a global sea state bias model separately to ascending tracks and to descending tracks, and at each crossover point, finding a difference between the ascending sea state bias estimates and the descending sea state bias estimate. Then apportion the amount of sea state bias to apply to the ascending and descending track SSH measurements by minimizing the sum of the rms differences at the crossover points in the region.

DETAILED DESCRIPTION OF EMBODIMENTS OF THE INVENTION

Figure 1:
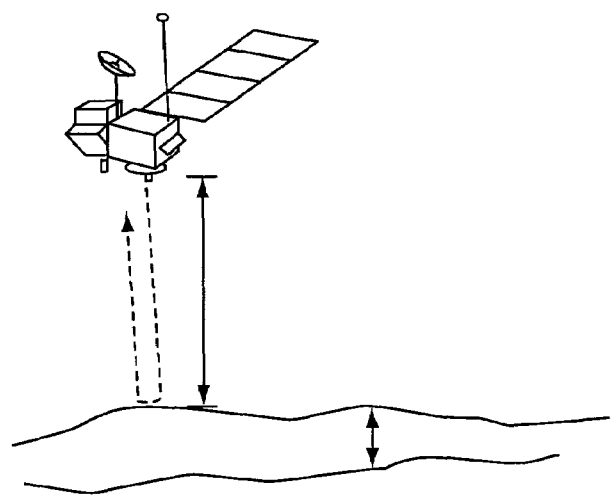
FIG. 1 is an illustration of sea surface height and the marine geoid.
Figure 2:
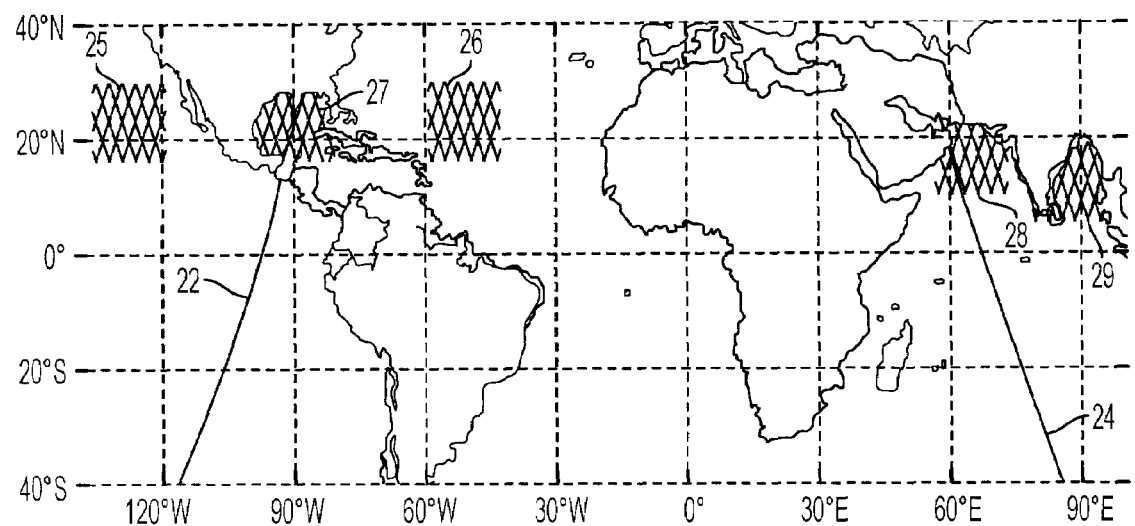
FIG. 2 is an illustration of a satellite orbit overlaid on a world map and five representative regions for which the Jason-1 and T/P satellite altimetry data is compared.

As seen in FIG. 2, satellite orbits include both ascending tracks 22 (generally south to north) and descending tracks 24 (generally north to south). A ground track is the theoretical mark laid on the surface of the earth by the orbiting satellite passing directly overhead. The satellite orbit repeats itself approximately every 10 days, that is, it passes over the same point on the earth every 10 days. Each 10-day repeat orbit is referred to as a cycle. During each cycle the satellite completes a sinusoidal shaped flight path, with the oscillations occurring in a north/south direction while the orbit proceeds from west to east. Each direction of oscillation is then referred to as an individual track. That is, individual tracks are laid down each time the oscillation changes direction. For instance, when the satellite is moving northward is one track, and when it changes direction and moves southward is another. There are 254 individual tracks per cycle.

Sea surface height data from the JASON-1 and TOPEX/POSEIDON satellites was compared for the five regions illustrated in FIG. 2. By comparing the height measurements made with the satellites during their ascending tracks with the SSH measurements made by the satellites during their ascending tracks as they passed over the same location, a bias was found that is different for ascending tracks and descending tracks.

A sea surface height bias can be defined as $\Delta(x,y,t)=SSH_J(x,y,t)-SSH_T(x,y,t)$, where $SSH_J(x,y,t)$ is the sea surface height measured with the JASON-1 satellite, and $SSH_T(x,y,t)$ is the sea surface height measured with the TOPEX/POSEIDON satellite.

Data from five representative test regions taken during the eight month verification tandem phase of Jason-1, when both Jason-1 and T/P operated in tandem tracks, have been examined. The test regions were the Gulf of Mexico, Arabian Sea, Bay of Bengal, and locations in the Pacific Ocean and the Atlantic Ocean away from land.

Figure 3:
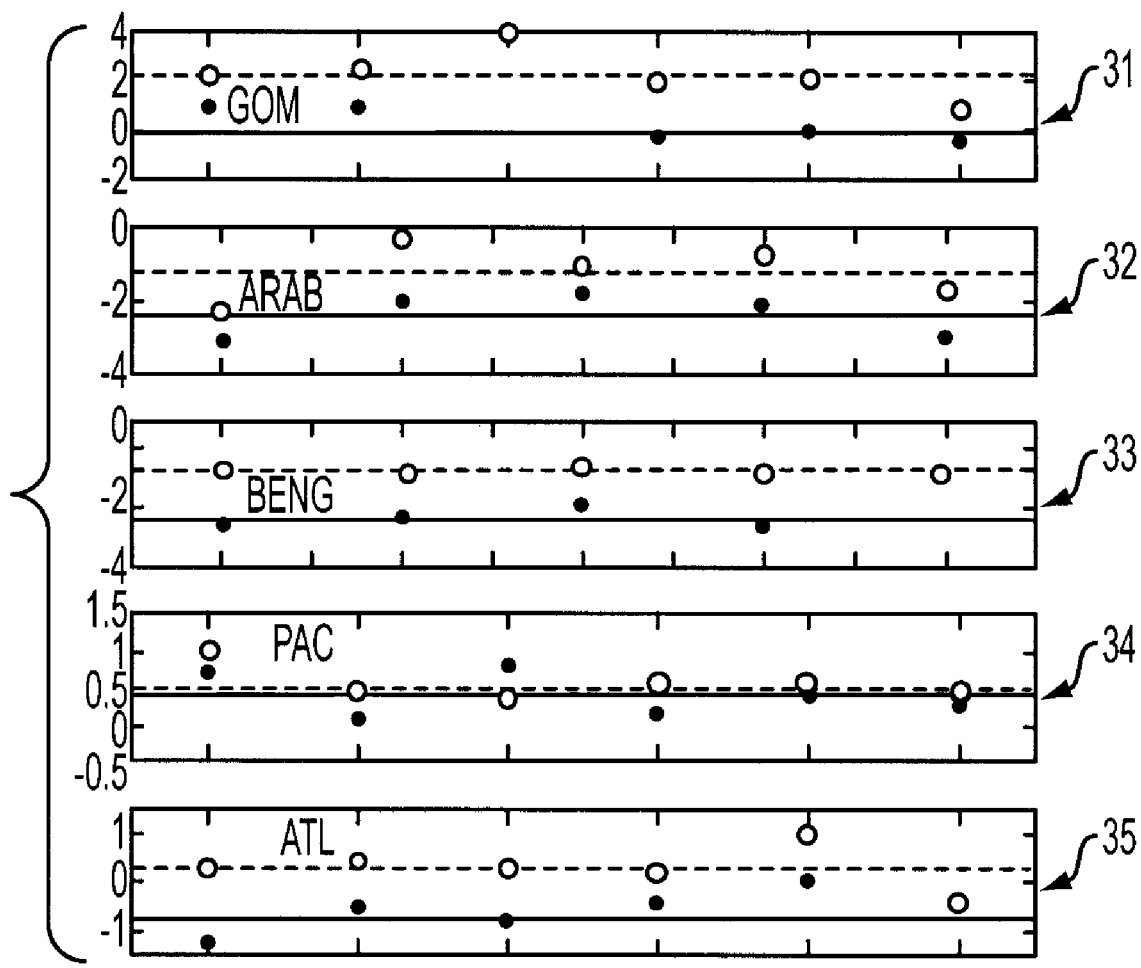
FIG. 3 shows the mean bias for ascending tracks (black dots) and descending tracks (open circles) in the five regions of FIG. 2.

FIG. 3 includes plots 31, 32, 33, 34, and 35 that illustrate the bias $\Delta(x,y,t)$ found for ascending tracks and for descending tracks for the FIG. 2 regions 25, 26, 27, 28, and 29, respectively. In all five regions the SSH bias $\Delta(x,y,t)$ was found to be different for the ascending track and the descending tracks. For example, in the Gulf of Mexico, the plot 31 shows the SSH bias $\Delta(x,y,t)$ for ascending tracks is −0.13 cm, and the bias $\Delta(x,y,t)$ for ascending tracks is 2.19 cm. In the Arabian Sea plot 32, the SSH bias $\Delta(x,y,t)$ for ascending tracks is −2.45 cm, and the SSH bias $\Delta(x,y,t)$ for ascending tracks is 2.19 cm. The bias $\Delta(x,y,t)$ appears to depend both on track orientation (ascending vs. descending), and on significant wave height (SWH). This indicates problems may exist with existing models for calculating sea state bias for one or both of the altimeters on the Jason-1 and T/P.

Figure 4:
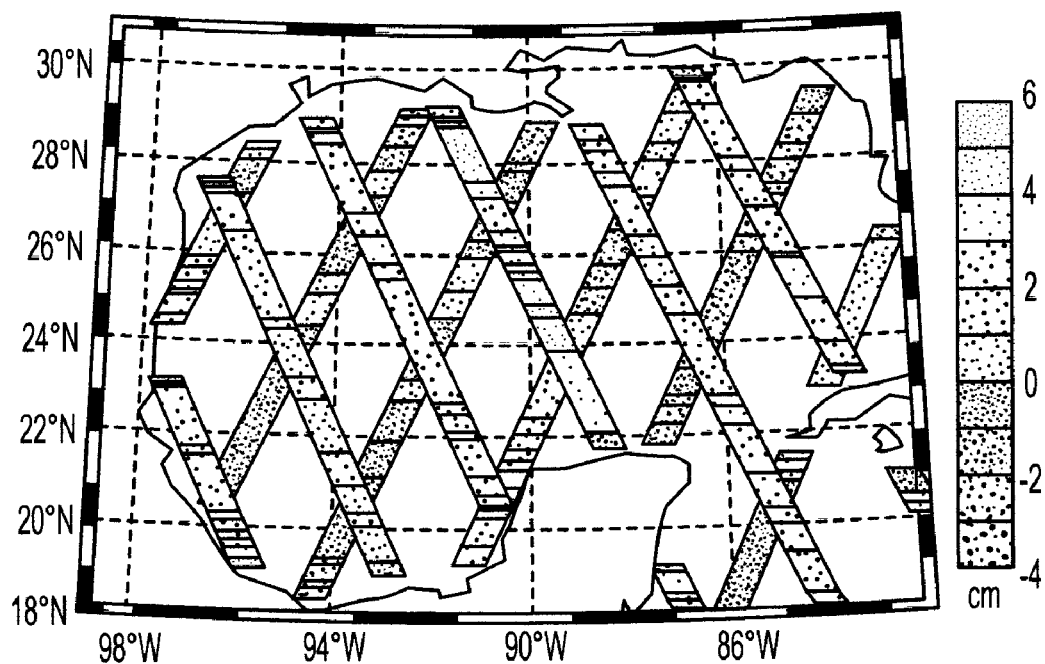
FIG. 4 illustrates the geographic distribution of sea surface height bias of Jason-1 relative to TOPEX/POSEIDON satellite tandem orbits.
Figure 5:
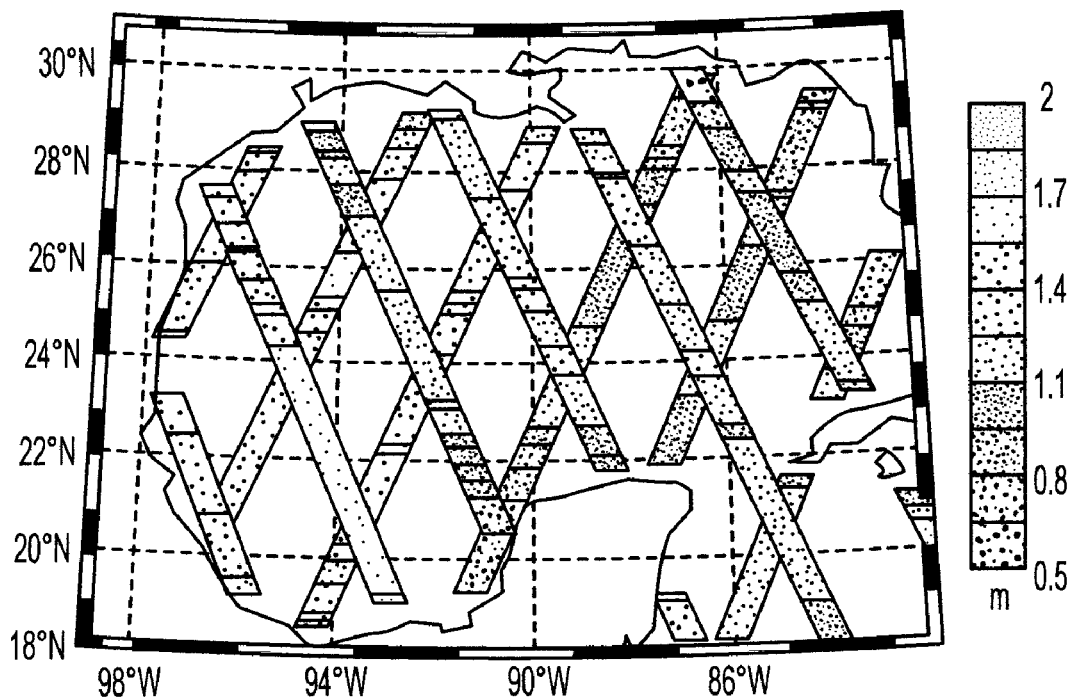
FIG. 5 illustrates the geographic distribution of significant wave height in the Gulf of Mexico.

FIG. 4 illustrates the SSH bias $\Delta(x,y,t)$ of Jason-1 relative to T/P in the Gulf of Mexico region. FIG. 5 illustrates the geographic distribution of SWH in the Gulf of Mexico measured with the Jason-1 radar. Note that both SWH and the SSH bias have short wavelength features indicated by the banded structure showing frequent changes in SSW and SSH bias along each track. The significant wave height can measured with either the Jason-1 or the T/P radar.

As seen in FIG. 4, the mean SSH biases in the Atlantic and Gulf of Mexico regions show Jason-1 consistently measures a higher SSH value than T/P for descending tracks, and a slightly lower SSH value is measured for ascending tracks. The mean biases in the Arabian Sea and Bay of Bengal regions show that Jason-1 measures a lower SSH value than T/P for both ascending and descending tracks. The mean biases in the Pacific Ocean region show that Jason-1 measures a slightly higher SSH than T/P for both ascending and descending tracks.

Figure 6:
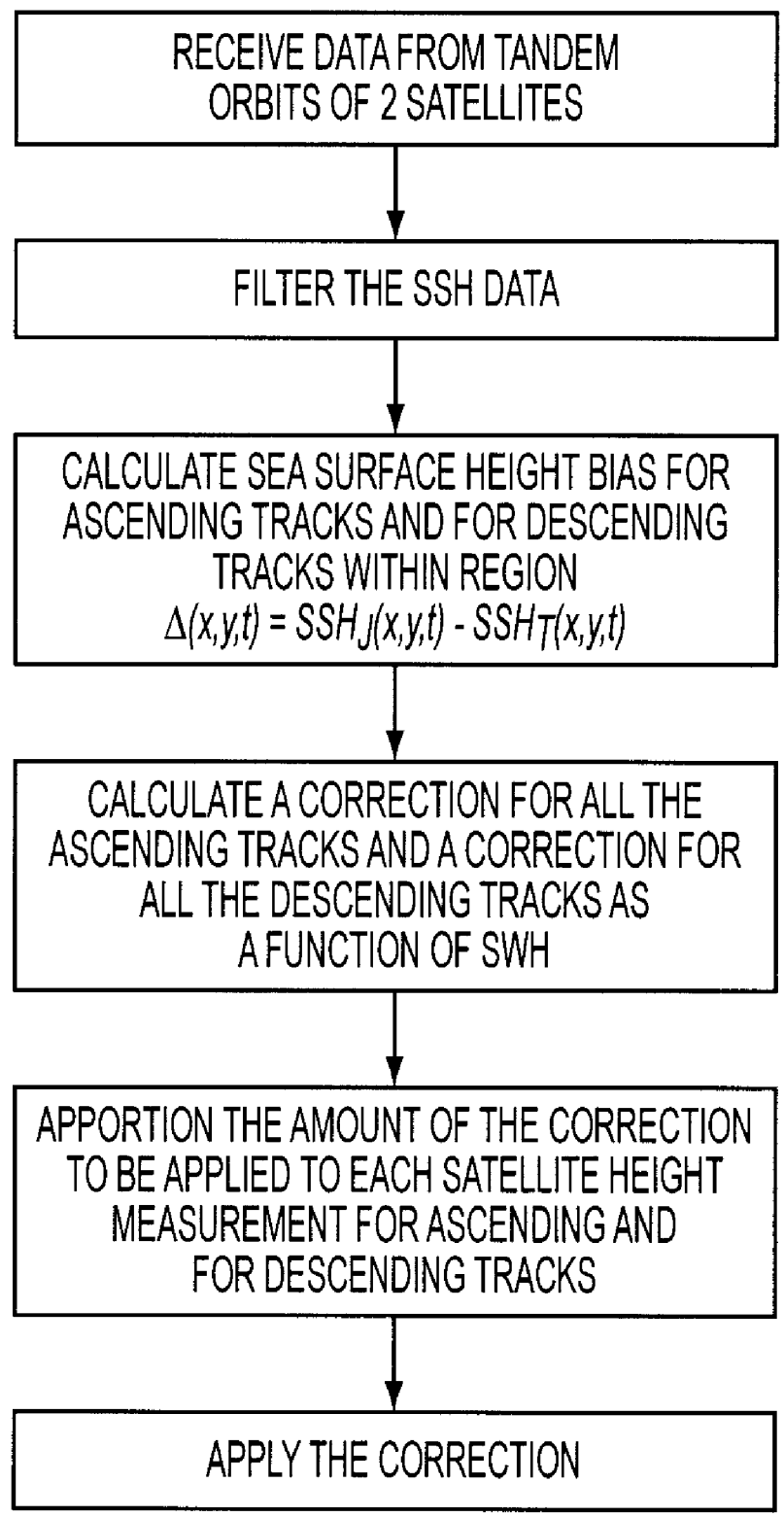
FIG. 6 illustrates a method for determining bias corrections for satellite altimetry measurements in accordance with an embodiment of the invention.

Regional SSH correction An embodiment of the invention is directed to a method for correcting the bias in satellite based sea surface height measurements within a geographical region, as seen in FIG. 6. First, calculate the sea surface height bias $\Delta(x,y,t)=SSH_J(x,y,t)-SSH_T(x,y,t)$ along each ascending and each descending ground track within a region for a tandem satellite mission in which the satellites orbit the same track and are close in time.

Figure 7:
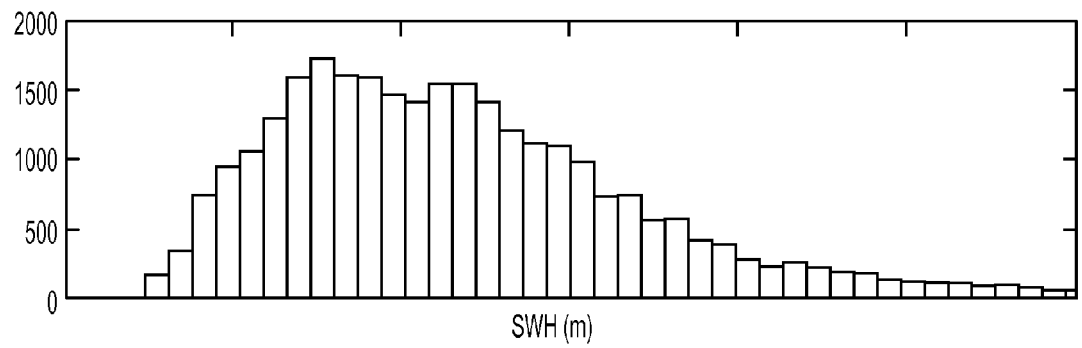
FIG. 7 illustrates a histogram of significant wave height in the Gulf of Mexico.

Select a range of SWH in the region based on a histogram of SWH in the region, as shown in FIG. 7. In this example, the SWH range is from about 0.25 m to 3 m.

The SSH can be filtered to reduce the white noise of the measurements, which will provide a more robust fit. The SSH filter can be the filter by Powell and Leben discussed in "An optimal filter for geostrophic mesoscale currents from along track satellite altimetry", J. Atmos. Oceanic Tech., Vol. 21, pages 1633-1642, 2004) is applied to the SSH data to minimize the error in SSH. The length of the filter is based on the dominant scale of interest as determined by the baroclinic Rossby radius of deformation. The width of this filter is typically twice the Rossby radius. In the Gulf of Mexico, the radius is about 40 km.

The region can be any selected oceanic region for which satellite altimetry data is available. Individual regions require at least 1 crossover of tracks to constrain the biases between ascending and descending tracks. The size (e.g. extent in latitude or extent in longitude) of the region should be between about 1 and about 5 times the baroclinic Rossby radius of deformation.

Figure 8:
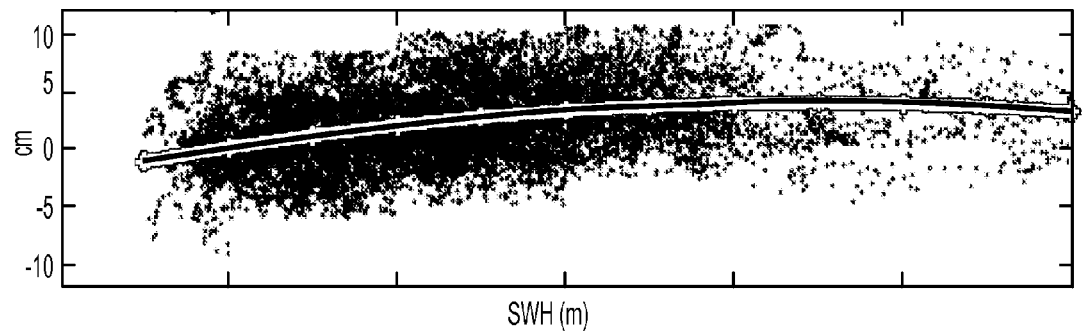
FIG. 8 illustrates a plot of bias as a function of significant wave height for descending satellite tracks.
Figure 9:
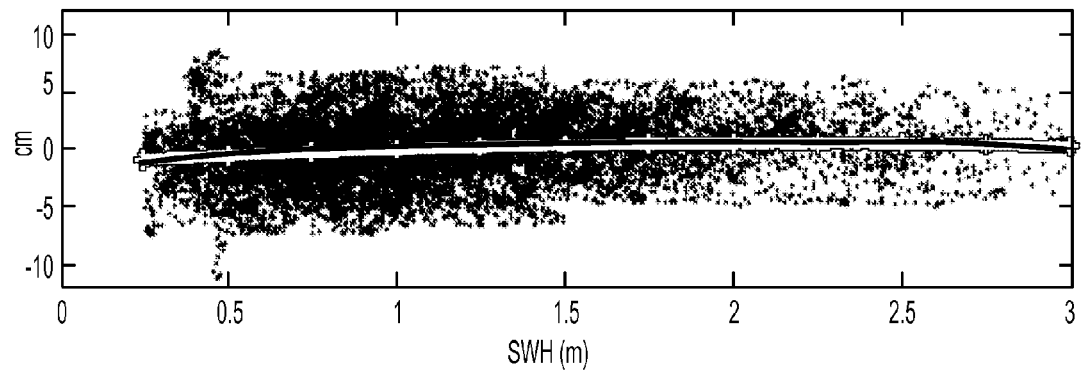
FIG. 9 illustrates a plot of bias as a function of significant wave height for ascending satellite tracks.

Determine the SSH bias corrections within a geographical region as follows. For each ascending track track in the region, calculate SSH bias $\Delta(x,y,t)$ values for different points along the track using the filtered SSH data from the Jason-1 and T/P altimeters. The points 82 in FIG. 8 are the SSH bias $\Delta(x,y,t)$ values plotted against the SWH at points in one ascending track in the Gulf of Mexico region. Similarly, calculate the SSH bias values for points in the descending tracks in the region using the filtered SSH data from the Jason-1 and T/P altimeters. The points 92 in FIG. 9 are the SSH bias $\Delta(x,y,t)$ values plotted against the SWH at points in one descending track in the Gulf of Mexico region.

A second order polynomial 84 is least squares fit to the bias $\Delta(x,y,t)$ as a function of the selected SWH range for each of the ascending track. Similarly, a second order polynomial 94 is least squares fit to the bias data 92 as a function of the selected SWH range for each of the descending tracks. As a result, each track will have a least squares fit polynomial of the bias $\Delta(x,y,t)$ versus the SWH. So, for a point along a track, a correction value can be found that corresponds to the SWH value for a location on the track using the least squares fit polynomial for that track.

In order to determine how much of the correction should be applied to the SSH values measured by Jason-1 and how much of the correction should be applied to the SSH values measured by T/P the crossover points of the ascending and descending tracks are considered. A constraint is applied that minimizes the sum of the rms differences of SSH at the crossover points for T/P and Jason-1 for the region. A percentage of the bias is found that should be removed from respective tracks of T/P or Jason-1.

Figure 10:
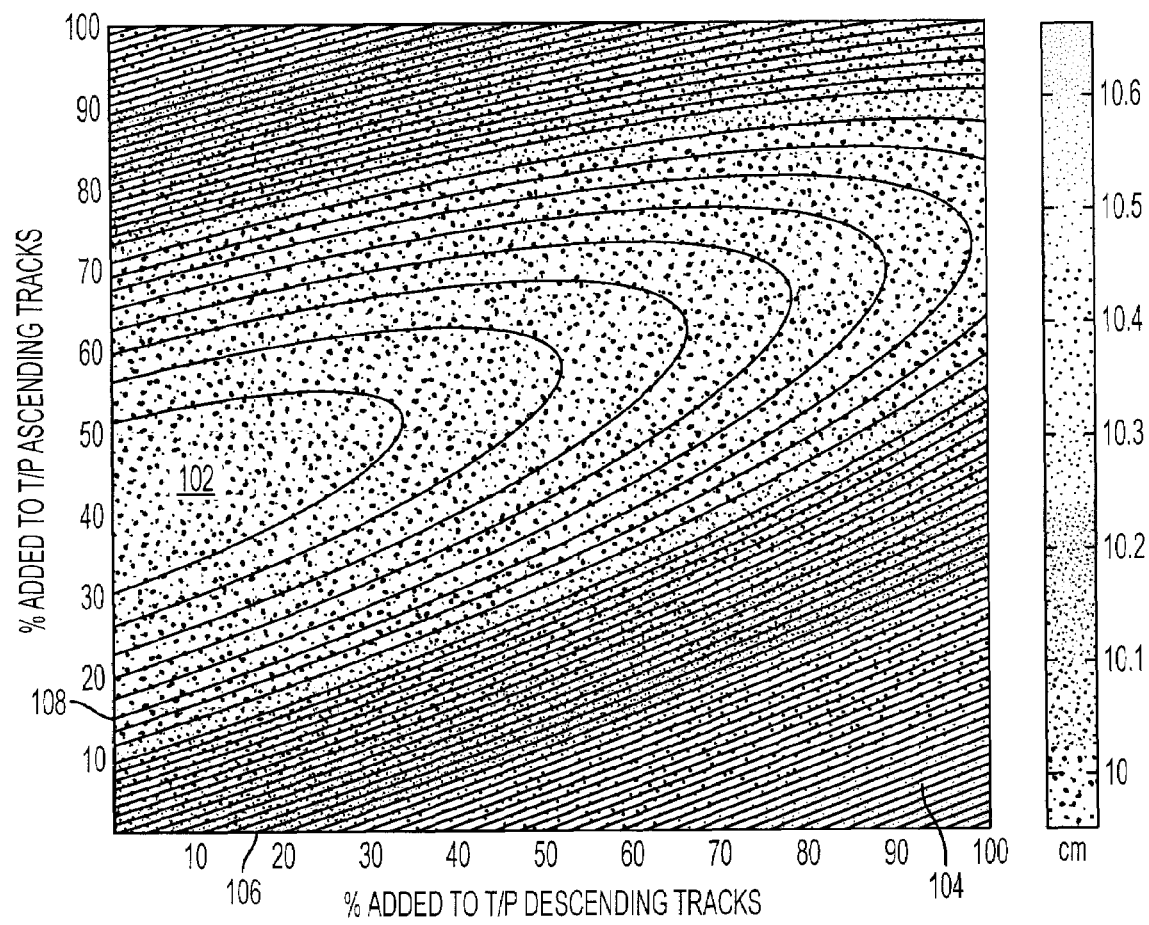
FIG. 10 is a graphical illustration of the sum of rms differences of TOPEX/POSEIDON and Jason-1 crossover points in the Bay of Bengal.
Figure 11A:
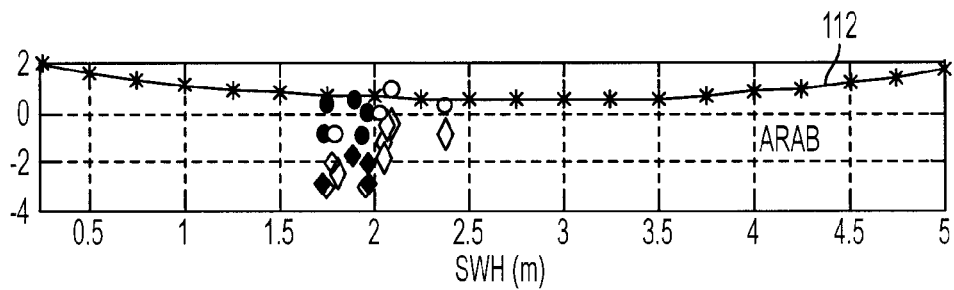
FIG. 11A-11E illustrate the difference between corrections for descending tracks and ascending tracks in each of the regions of FIG. 2.
Figure 11B:
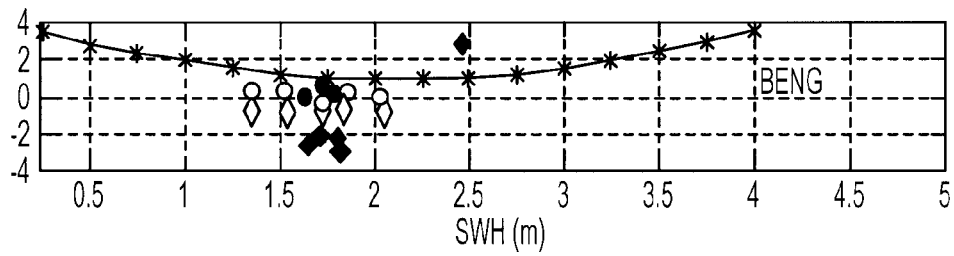
Figure 11C:
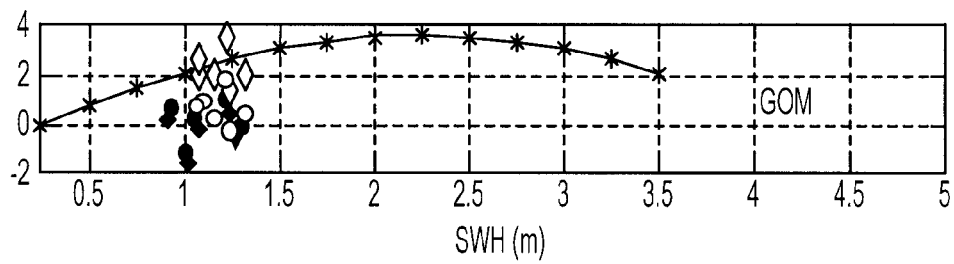
Figure 11D:
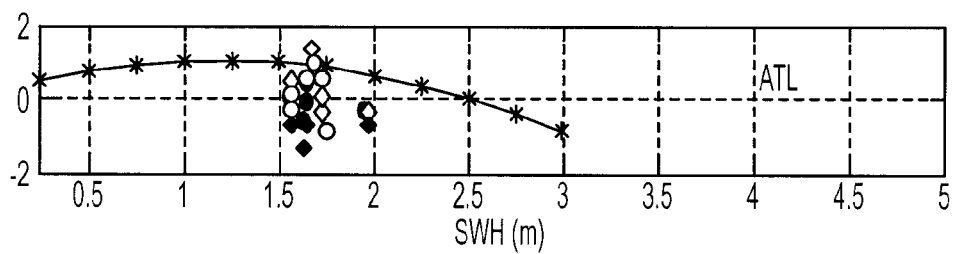
Figure 11E:
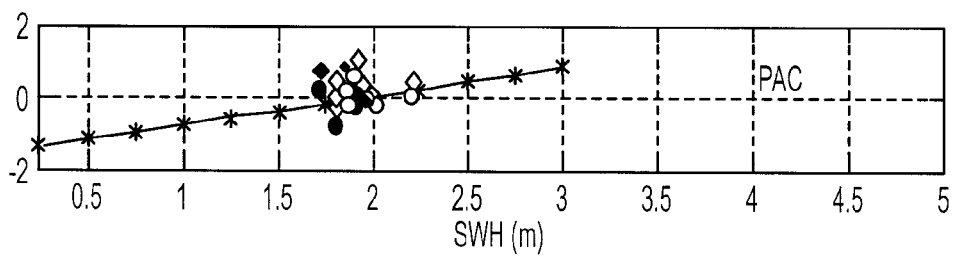

As an example, FIG. 10 shows the sum of the rms differences of T/P and Jason-1 crossover points in the Bay of Bengal region. The abscissa 106 shows what percentage of the correction should be added to the TIP descending tracks and the ordinate 108 shows what percentage of the correction should be added to the T/P ascending tracks. Each curve in the plot represents an equal value of the rms sum, with the largest rms sum in shown in the region 102 and the lowest rms sum in the region 104. Select the region of the graph with the lowest sum of the rms differences. Here, the sum of the rms differences is lowest at about a 0 value on the abscissa 106 and about a 42 value on the ordinate 108. Thus, in order to minimize the rms difference of the crossover points, 0% should be added to the T/P descending tracks, and 42% should be added to the T/P ascending tracks.

The percentage of corrections to be subtracted from the Jason-1 ascending and descending tracks is 100 minus the percentage of the T/P correction. In this example, 100% is substracted from the Jason-1 descending tracks, and 58% is substracted from the Jason-1 ascending tracks. The percentage of the corrections to apply to the SSH measurements ascending and descending tracks of the TIP and Jason-1 is as follows.

| Region | T/P ascending | T/P descending | Jason-1 ascending | Jason-1 descending |
|---|---|---|---|---|
| Arabian Sea | 100% | 0% | 0% | 100% |
| Bay of Bengal | 45% | 0% | 55% | 100% |
| Gulf of Mexico | 0% | 28% | 100% | 62% |
| Atlantic | 100% | 0% | 0% | 100% |
| Pacific | 53% | 44% | 47% | 56% |

In all five regions the rms difference for the crossover points remains the same or is reduced for both T/P and Jason-1 SSH measurements after application of the correction to the SSH. In the following table, Column 1 is the rms difference of T/P crossover points before correction, Column 2 is the rms difference of T/P crossover points after correction, Column 3 is the rms difference of Jason-1 crossover points before correction, and Column 4 is the rms difference of Jason-1 crossover points after correction.

| Region | T/P orig | T/P corr | Jason-1 orig | Jason-1 corr |
|---|---|---|---|---|
| Arabian Sea | 5.66 | 4.74 | 4.88 | 4.47 |
| Bay of Bengal | 4.92 | 4.81 | 5.12 | 5.02 |
| Gulf of Mexico | 7.38 | 7.31 | 7.33 | 7.14 |
| Atlantic | 4.18 | 4.15 | 3.82 | 3.82 |
| Pacific | 3.35 | 3.34 | 3.35 | 3.34 |

Once the correction values have been determined for different tandem satellite tracks, one can apply the correction to SSH values from a particular ascending or descending track on the Jason-1 or T/P as follows. Find the mean SWH value for that track, determine the correction to the SSH that corresponds to that SWH value for that track from the least squares fit polynomial, and apply the appropriate percentage of the correction to the SSH value. The resulting SSH percent corrections for the ascending and descending tracks in a region can also be stored in a table or database for later reference, so that a user can look up and apply the appropriate SSH correction to the altimeter SSH measurement when needed.

This SSH correction is one of several adjustments that can be made to SSH measurements, including the SSB value from a global SSB model, and is applied in to the SSH measurement in addition to the other adjustments.

FIG. 11 illustrates the difference between corrections for descending and ascending tracks as a function of SWH for each of the five regions. The circles represent the mean bias after regional corrections have been applied. The black lines with asterisks 112 represent the difference between the corrections for descending and ascending tracks in each region (i.e., curve 84 minus curve 94 in FIG. 8 and 9) as a function of SWH. The solid and outlined diamonds represent the original mean bias of the ascending and descending tracks, respectively. The red and black circles represent the mean bias after the regional corrections have been applied. Each circle and diamond is plotted at the mean SWH of its respective track (calculated over all available cycles).

Note that in some instances, applying a regional bias correction can slightly increase the bias for some individual tracks. For example, using this regional bias correction increases the Jason-1 bias from 3.35 to 3.34 in the Pacific region.

Track SSH correction In another embodiment of the invention, the bias correction is determined based on an individual track within a region and its cross over points. This example illustrates determining the bias correction for an ascending track, however, the method is also applied to descending tracks. In this example, an ascending ground track with three cross over points is considered.

For a tandem satellite mission, in which the satellites orbit the same track and are close in time, first calculate the sea surface height bias $\Delta(x,y,t)$ along each ascending ground track, where $\Delta(x,y,t)$ is the difference between the Jason-1 SSH measurement and the T/P SSH measurement made during ascending tracks. Next, calculate the sea surface height bias $\Delta(x,y,t)$ for the descending tracks at the crossover points with the ascending track. Next, calculate the corrections to the sea surface height by fitting a second order polynomial to the sea surface height bias as a function of significant wave height for the ascending portion of a track.

Then constrain the resulting SSH biases for the ascending track so the global rms crossover differences of SSH are minimized by applying the appropriate percentage of the SSH bias correction to the Jason-1 SSH measurement and the T/P altimeter measurements, respectively.

Note that this track correction method can also be applied to an individual descending track and the crossover points with ascending tracks in the region.

Figure 12:
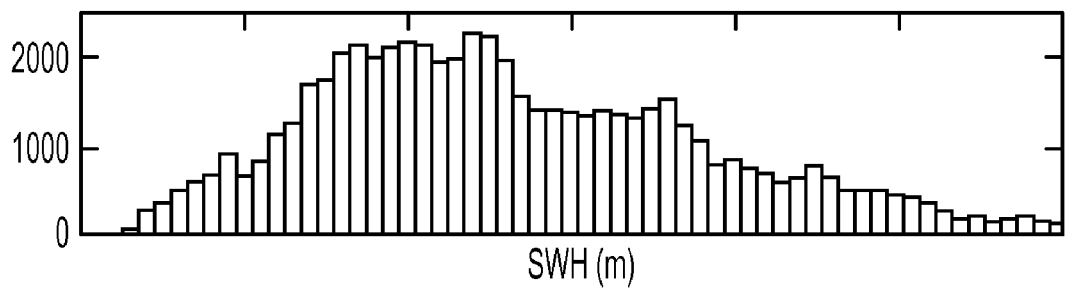
FIG. 12 is a histogram of the significant wave heights for a satellite track.
Figure 13:
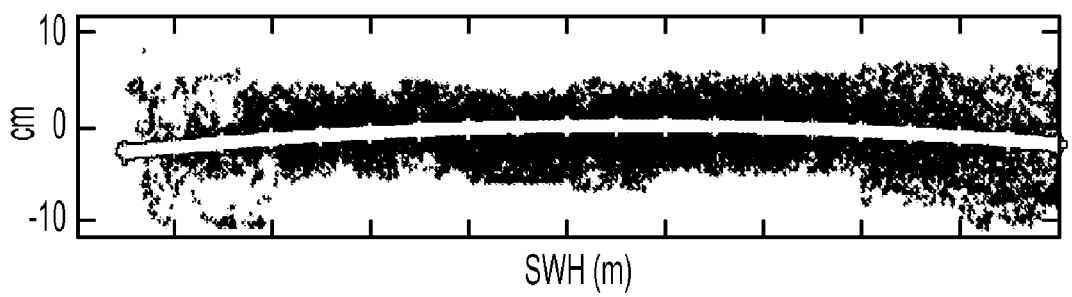
FIG. 13 illustrates a plot of bias as a function of significant wave height for a descending satellite track.
Figure 14:
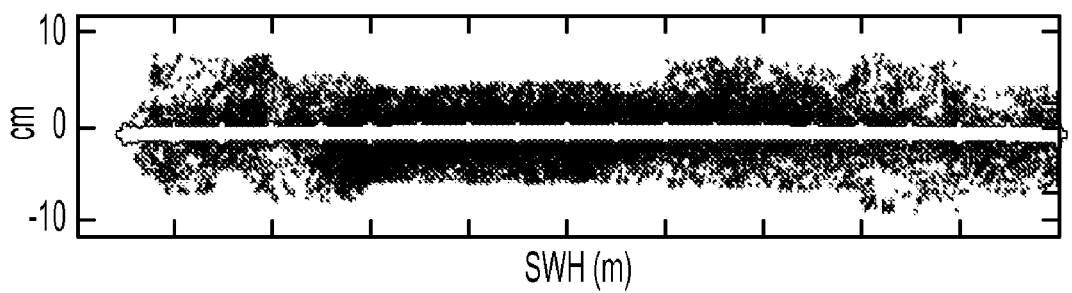
FIG. 14 illustrates a plot of bias as a function of significant wave height for an ascending satellite track.
Figure 15:
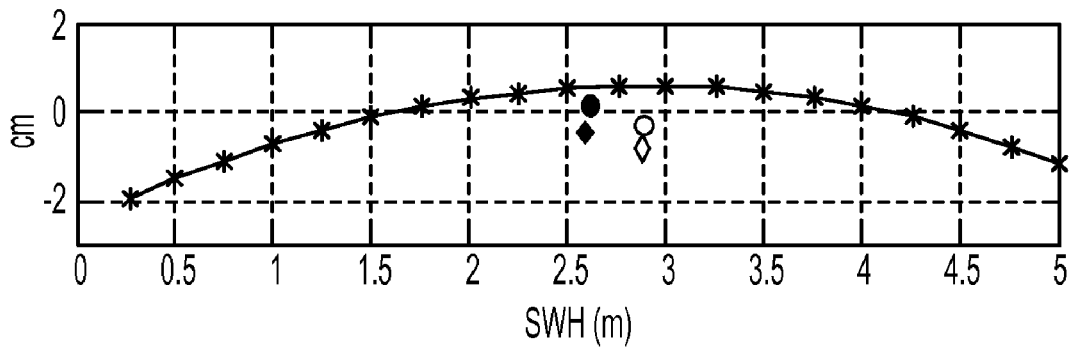
FIG. 15 illustrates the difference between corrections for a descending portion of a track and an ascending portion of the track.

FIG. 12 is a histogram of the SWH for a track 8 in the Pacific Ocean shown by reference numerals 22 and 24 of FIG. 2. FIG. 13 shows bias as a function of SWH for the descending portion of this satellite ground track, and the least squares fit of a second order polynomial to the bias as a function of SWH for the descending portion of this track. FIG. 14 illustrates bias as a function of SWH for the ascending portion 22 of track 8, and the least squares fit of a second order polynomial to the bias as a function of SWH. FIG. 15 illustrates the difference between the correction for the descending and ascending portions of the track. The diamonds represent the original mean biases of the ascending and descending portions of track 8, respectively, plotted at the mean SWH of the respective ascending or descending portion of the track. The circles represent the mean biases after application of the correction, plotted at the mean SWH of the respective ascending or descending portion of the track.

Single Satellite SSH correction In many cases, satellites are not operated in tandem, and track data is available from a satellite in an individual orbit. Another embodiment of the invention is directed to a method for correcting the sea surface height bias between ascending and descending tracks for a satellite not in a tandem orbit with another satellite orbits or for a satellite in an individual orbit.

First, calculate the sea surface corrections as a function of sea wave height and windspeed with a global model Sea Surface Bias (SSB) formula. A suitable SSB model used to correct the data for the Jason satellite is a preliminary nonparametric model for Jason. A suitable SSB model for TOPEX is an updated SSB model developed by Chambers, Hayes, Ries, and Urban ("New TOPEX sea state bias models and their effect on global mean sea level, J. Geophys. Res. 108 (C10), 3305, doi:10.1029/2003JC001839, 2003). Apply the SSB formula separately along the ascending and descending portions of the satellite tracks to calculate a set of model coefficients for individual ascending and descending portions of each ground track.

Figure 16:
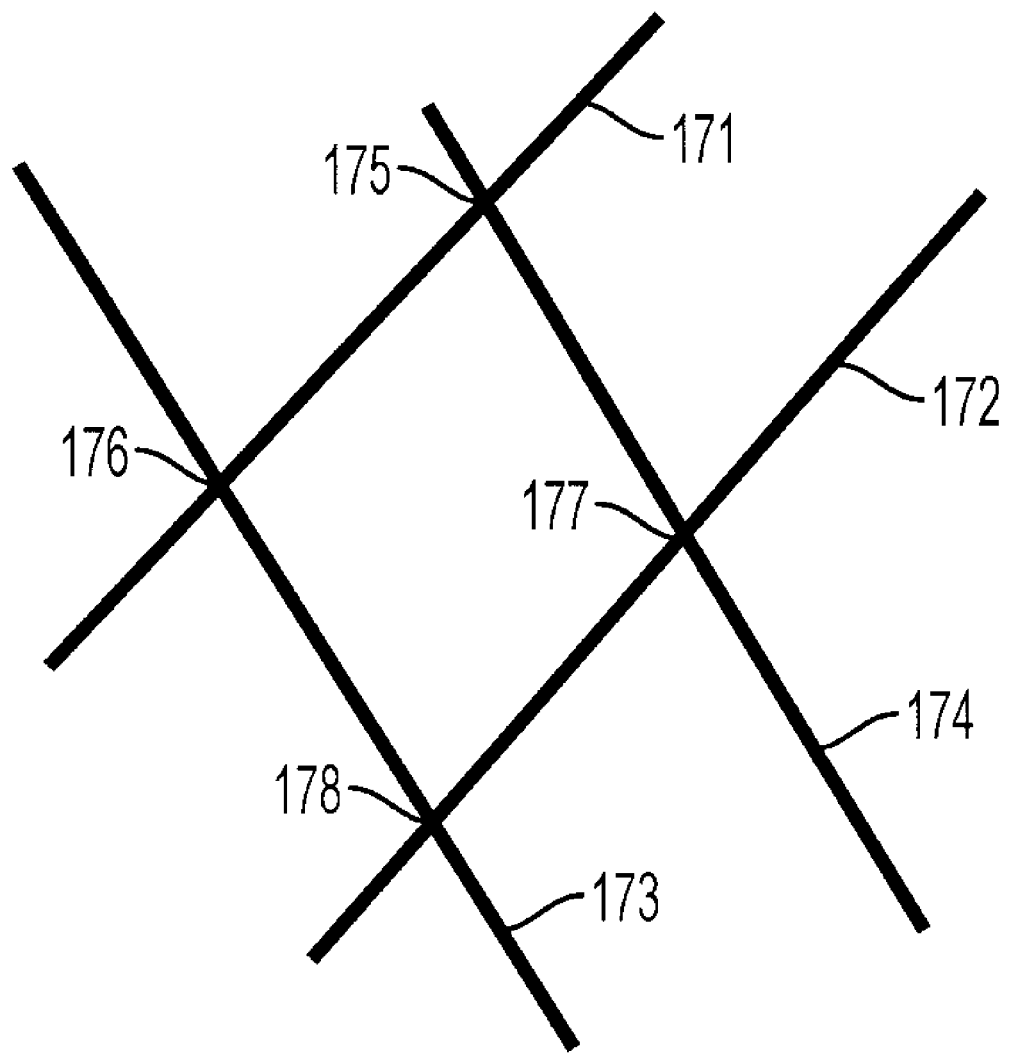
FIG. 16 illustrates a set of ascending and descending tracks for use in another embodiment of the invention with a single satellite.

As an illustration, FIG. 16 represents a region in which the satellite passes over the region in two ascending tracks 171 and 172 and two descending tracks 173 and 174, forming four cross over points 175, 176, 177, and 178. Apply the SSB formula to points along each track 171, 172, 173, and 174.

A crossover difference is found for each crossover point. For example, at crossover point 175, the crossover difference $\Delta_1(x,y,t)$ is the calculated SSB from the global formula for the ascending track 171 minus the calculated SSB from the global formula for the descending track 174 at the cross over point. A crossover difference value $\Delta_1(x,y,t)$ is found for each of the four crossover points in the FIG. 17 region. Next, determine what percent of the resulting crossover difference value should be applied to the ascending and descending track measurements, respectively, so as to minimize the global rms crossover differences of SSH in the region. In this example, minimize the rms sum of the four $\Delta_1(x,y,t)$ values at crossover points 175-178.

The percentage of the bias applied to the individual ascenders and descenders is determined numerically such that the crossover differences in SSH for individual tracks are minimized.

To apply these corrections to a SSH measurement taken during a particular ascending or descending track of an individual satellite, find the SSB estimate for that track, the crossover difference at that point, and the appropriate percentage to apply to the track depending on whether the track is ascending or descending, and apply the appropriate percentage of the SSB estimate to the SSH measurement at that location.

As a result, for an individual point on a track, the revised SSH will be equal to the measured SSH plus the appropriate percentage of the global formula SSB estimate.

For any of the methods discussed above, filtering the sea surface height measurements before determining the sea surface height bias can remove the short wavelength white noise while retaining the mesoscale wavelength structure. A suitable filter is discussed in Powell, B. S., and R. R. Leben, "An optimal filter for geostrophic mesoscale currents from along track satellite altimetry", J. Atmos. Oceanic Tech., Vol. 21, pages 1633-1642 (2004). This filter is consistent with the SSH processing.

The width of the filter is selected based on the dominant scale of interest, and can be chosen so the filter half-power wavelength most closely exceeds twice the first baroclinic Rossby radius of deformation. The first baroclinic Rossby radius of deformation is related to the dominant length scale of mesoscale variability, as discussed in Chelton, D. B., R. A. deSzoeke, M. G. Schlax, K. El Naggar, and N. Siwertz, "Geographical variability of the first baroclinic Rossby radius of deformation", J. Phys. Oceanogr., Vol. 28, pages 433-460 (1998). The dominant scales of interest are typically the low frequency motions that range from seasonal to annual fluctuations in the region. The Rossby radius depends on latitude, water depth, and water density. The filter half power wavelength for each region is based on the first baroclinic Rossby radius of deformation.

As an example, in the Gulf of Mexico, the deformation radius is about 40 km, so the filter width is chosen as 13 points. When applied to the 1 Hz SSH data, the filter has a window width of 92.9 km. When applying the filter, only segments longer than 13 points without any missing data are allowed, in order to eliminate any enhanced error that might be caused by using shorter filter lengths or interpolation. The filter half width of 6 points is lost from the beginning and ending of each segment of data.

Figure 17:
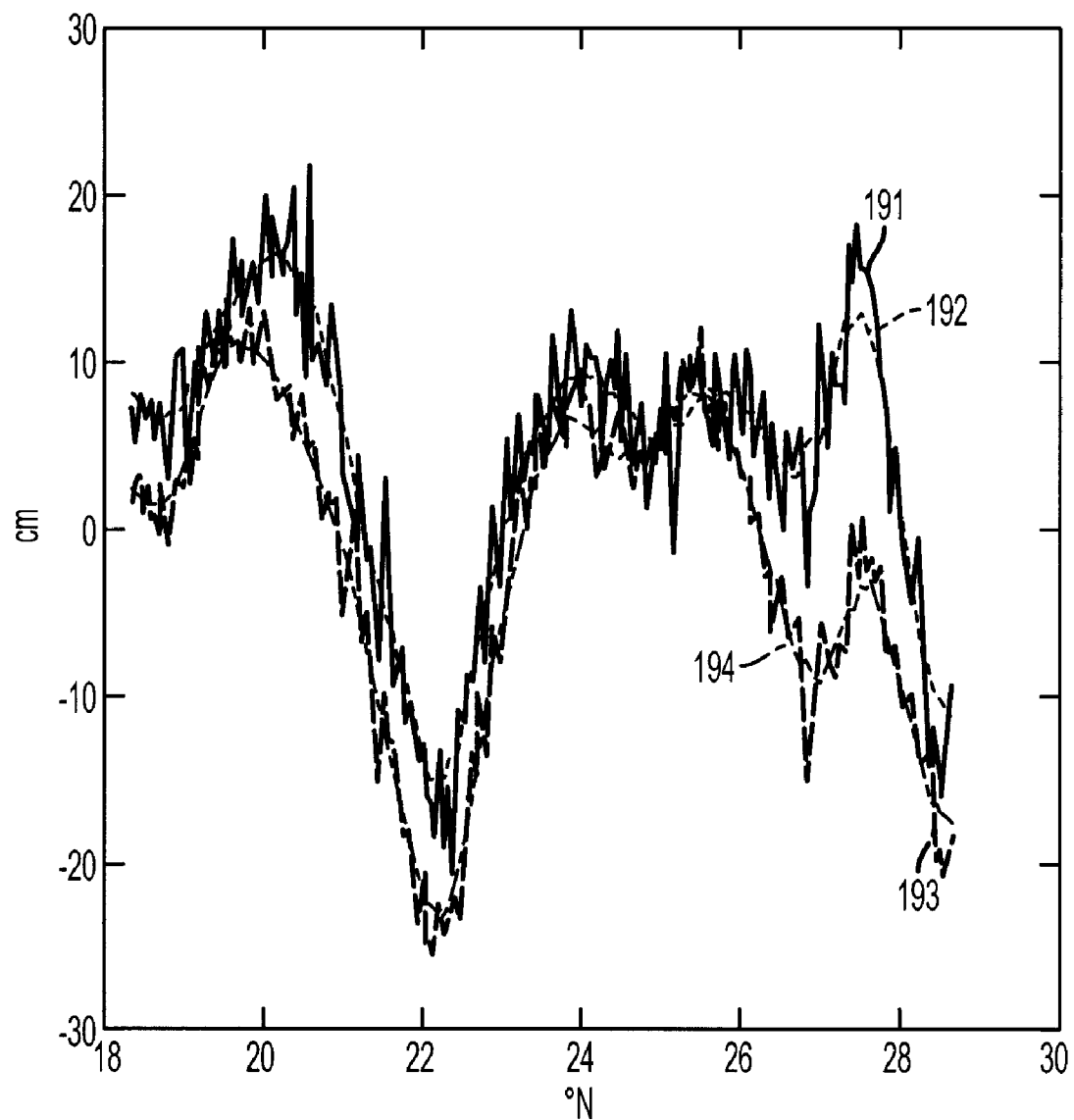
FIG. 17 illustrates raw and filtered Jason-1 and T/P sea surface height data.

FIG. 17 illustrates the effect of filtering the raw Jason-1 and T/P SSH data for track 102, TIP cycle 343, Jason cycle 3. Curve 191 is the raw Jason-1 SSH. Curve 192 is filtered Jason-1 SSH. Curve 193 is the raw T/P SSH. Curve 194 is the filtered T/P SSH.

It is preferred that the same filter should be applied to all of the altimetry data from both the Jason-1 and the TIP satellites.

Other filtering methods are also suitable, including running averages and low-pass filtering, and similar low pass filters.

Other embodiments include computer software and computer programs, as well as computer systems and computer readable media having programs for implementing the methods discussed above. A computer system is generally applicable for the various embodiments described according to the present invention. The computer system can include a processor, a volatile memory, e.g., RAM, a keyboard, a pointing device, e.g., a mouse, a nonvolatile memory, e.g., ROM, hard disk, floppy disk, CD-ROM, and DVD, and a display device having a display screen. Memory can store program instructions that are executable by a processor to implement various embodiments of a method in accordance with the present invention. A communications device may also be connected to enable information exchange between the computer system and other devices.

It should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include FORTRAN, XML, C++ objects, Java and Microsoft Foundation Classes (MFC).

Other embodiments of the invention include methods and systems for receiving, further processing, making available for download, and/or transmitting the correction results.

While this invention has been particularly shown and described with reference to preferred embodiments thereof, it will be understood by those skilled in the art that various changes in form and details may be made therein without departing from the scope of the invention emcompassed by the appended claims.

What is claimed is:

1. A method for determining a bias correction to a sea surface height measurement from a first satellite in a region, wherein the first satellite and a second satellite operate in a tandem orbit, an ascending track bias exists between the sea surface height measurements of the first and second satellites, and a descending track bias exists between the sea surface height measurement of the first and the second satellites, the method comprising:
   determining a correction for the ascending track sea surface height measurement;
   separately determining a correction for the descending track sea surface height measurement; and
   apportioning a portion of the correction to the sea surface height measurement from the first satellite.

2. The method according to claim 1, wherein said determining a correction for the ascending sea surface height measurement comprises least squares fitting a polynomial to the ascending track bias as a function of significant wave height, and said determining a correction for the descending sea surface height measurement comprises least squares fitting a polynomial to the descending track bias as a function of significant wave height.

3. The method according to claim 2, wherein the ascending track bias is a difference between the sea surface height measurement made from the first satellite and the second satellite for an ascending track.

4. The method according to claim 2, wherein the descending track bias is a difference between the sea surface height measurement made from the first satellite and the second satellite for descending track.

5. The method according to claim 2, wherein the portion of the correction applied to the sea surface height measurement is an amount that minimizes the rms differences of the ascending and descending track polynomials with the portion of the correction applied to the whole track.

6. The method according to claim 1, comprising filtering the sea surface height measurements before determining the ascending track bias and the descending track bias.

7. The method according to claim 1, wherein the region has a length of between 1 and 5 times a baroclinic Rossby radius of deformation for the region.

8. The method according to claim 1, wherein each region has at least one crossover point.

9. A method for determining a bias correction to a sea surface height measurement from a satellite in a region having at least one cross over point between an ascending track and a descending track, comprising:
   estimate sea state bias by applying a global sea state bias model separately to ascending tracks and to descending tracks;
   at each crossover point, finding a difference between the ascending sea state bias estimates and the descending sea state bias estimate;
   apportion the amount of sea state bias to apply to the ascending and descending track SSH measurements by minimizing the sum of the rms differences at the crossover points in the region.

10. The method according to claim 9, wherein the satellite is TOPEX.

11. The method according to claim 9, wherein the satellite is Jason-1.

* * * * *